United States Patent
Namekawa

Patent Number: 5,390,963
Date of Patent: Feb. 21, 1995

[54] TUBE COUPLER

[75] Inventor: Yukio Namekawa, Tokyo, Japan

[73] Assignee: Nitto Kohki Co., Ltd., Tokyo, Japan

[21] Appl. No.: 156,720

[22] Filed: Nov. 24, 1993

[30] Foreign Application Priority Data

Nov. 26, 1992 [JP] Japan ................. 4-87313[U]

[51] Int. Cl.⁶ ............... F16L 55/00; F16L 37/18
[52] U.S. Cl. .................. 285/86; 285/91; 285/316; 285/375
[58] Field of Search ........... 285/91, 86, 316, 317, 285/318, 375

[56] References Cited

U.S. PATENT DOCUMENTS

| | | | |
|---|---|---|---|
| 3,113,588 | 12/1963 | Torres | 285/316 X |
| 3,177,012 | 4/1965 | Faccou | 285/375 X |
| 3,982,776 | 9/1976 | Payne | 285/317 X |
| 4,012,059 | 5/1977 | Luke et al. | 285/317 X |
| 4,703,958 | 11/1987 | Fremy | 285/317 X |
| 4,749,192 | 6/1988 | Howeth | 285/86 |

FOREIGN PATENT DOCUMENTS

| | | | |
|---|---|---|---|
| 52-29311 | 7/1977 | Japan . | |
| 58-24069 | 5/1983 | Japan . | |
| 1749606 | 7/1992 | U.S.S.R. | 285/316 |
| 8001311 | 6/1980 | WIPO | 285/316 |

Primary Examiner—Randolph A. Reese
Assistant Examiner—Heather Chun Shackelford
Attorney, Agent, or Firm—Nixon & Vanderhye

[57] ABSTRACT

A tube coupler has a main tubular socket body connected to a first tube, a main tubular plug body connected to a second tube and removably connected to the main tubular socket body, and a locking mechanism for locking together the main tubular socket body and the main tubular plug body in a state in which the main tubular plug body is inserted in the main tubular socket body. The tube coupler further includes an operating ring threadably engaging the outer peripheral surface of the main tubular socket body, a slide ring mounted on the outer peripheral surface of the main tubular socket body and being moved axially by the operating ring, and a cylindrical holder slidably fitted in the main tubular socket body and engageable with the main tubular plug body. The holder has a groove open radially outward, and the main tubular socket body has axially elongated holes. The slide ring is provided with pins each having a distal end portion extending into the groove through the corresponding elongated hole. Each pin moves the holder in the same direction as the direction of the movement of the operating ring when the operating ring is moved toward the main tubular plug body, such that the pins press the main tubular plug body.

11 Claims, 2 Drawing Sheets

TUBE COUPLER

BACKGROUND OF THE INVENTION

1. Field of the Invention

This invention relates to a tube coupling provided with a locking mechanism by means of lock balls.

2. Description of the Related Art

There have been used various types of safety devices of locking mechanisms in which locking balls are set in an engaging state and a disengaging state selectively by slidably operating sleeves. For example, the assignee of the present application has proposed a tube coupler which is provided at the back of a main sleeve for a locking balls with a sub-sleeve for locking the main sleeve, as disclosed in Jpn. UM Appln. KOKOKU Publication No. 52-29311. With this related art, there occurs no fear that the main sleeve falls off even if an unexpected external force is applied to the main sleeve.

The assignee of the present application has also proposed a tube coupler which is provided at the side of a socket with a sealing mechanism comprising an adjusting ring and an intermediate tubular body slidable in the axial direction of the socket, in order to enhance the sealing effects between the abutting faces of a plug and a socket (see Jpn. UM Appln. KOKOKU Publication No. 58-24069). According to this related art, the sealing mechanism is adjusted externally to increase the sealing effect only by rotating the adjusting ring when the plug and the socket in a connected state.

Although both safety means for the locking mechanism and means for adjusting sealing of abutting ends are useful as the functions of the tube coupler, however, there has not yet been known a tube coupler which has these two means in a single unit.

SUMMARY OF THE INVENTION

The object of this invention is to provide a tube coupler provided with safety mechanism and means for adjusting a sealing state to increase safety and enhance connecting operativity.

According to this invention, there is provided a tube coupler for effecting fluid connection between a first tube and a second tube, which comprises a main tubular socket body having a first end portion connected to the first tube and a second end portion which is open, a main tubular plug body removably connected to the main tubular socket body and having a first end portion connected to the second tube and a second end portion inserted in the second end portion of the main tubular socket body, and a locking mechanism for locking together the main tubular socket body and the main tubular plug body in a state in which the second end portion of the main tubular plug body is inserted in the second end portion of the main tubular socket body, the locking mechanism having a sleeve slidably mounted on the outer peripheral surface of the second end portion of the main tubular socket body and a plurality of locking balls whose engagement with and disengagement from the outer peripheral surface of the main tubular plug body are controlled by operation of the sleeve, the tube coupler further including an operating ring threadably engaging the outer peripheral surface of the first end portion of the main tubular socket body, a slide ring mounted on the outer peripheral surface of the main tubular socket body so as to be slidable axially between the operating ring and the sleeve, first urging means for urging the slide ring and the sleeve in directions in which the slide ring and the sleeve are separated from each other, a cylindrical holder slidably fitted in the main tubular socket body and having a groove open radially outward, second urging means for urging the holder toward the second end portion of the main tubular socket body, sealing means provided on the holder and sealingly engageable with the second end portion of the main tubular plug body inserted into the second end portion of the main tubular socket body, the main tubular socket body formed in a tubular wall thereof with at least one elongated hole extending axially of the main tubular socket body, and at least one pin provided on the slide ring and having a distal end portion extending into the groove, the pin being cable of pushing the holder in the same direction as the direction of movement of the operating ring toward the main tubular socket body.

When the two tubes are connected by means of the tube coupler, the second end portion of the main tubular plug body is inserted into the main tubular socket body and the second end portion of the main tubular plug body is caused to abut against the sealing means such that the holder is retreated against the biasing force of the second urging means. The locking balls supported by the holder are moved onto the outer peripheral surface of the main tubular plug body and the sleeve is biased by the first urging means, whereby the plug and the socket are locked together by the locking mechanism.

Next, by the rotation of the operating ring, the slide ring advances and approaches the sleeve so as to restrict the movement of the sleeve. At the same time, the holder in engagement with the slide ring via the pin is moved so as to press the sealing means against the front face of the main tubular plug body. Thus, complete sealing between the end face of the main tubular plug body and the front end of the holder is ensured.

On the other hand, the plug is detached from the socket as follows. The slide ring is returned by the reverse rotation of the operating ring. When the sleeve is retreated after the sleeve has been unlocked, the ball-type locking mechanism is unlocked. In this stage, the holder is biased by the second urging force of the second urging means via the sealing means so as to press the main tubular plug body in the pull-out direction. Thus, the main tubular plug body and the main tubular socket body are smoothly separated from each other.

The tube coupler according to this invention comprises locking means of a sleeve and means for adjusting the sealing state of the end faces of the tube coupler. With the tube coupler, the locking of the sleeve and the complete sealing of the end faces of the tube coupler are carried out simultaneously. In consequence, safety and sealing ability of the tube coupler according to this invention remarkably increase as compared with the conventional tube coupler. Further, the tube coupler according to this invention exhibits an advantageous technical effect that the connection and disconnection of the tube coupler with and from the tubes can be made extremely easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

The preferred embodiment of this invention will be described with reference to the drawings.

Figure 2:
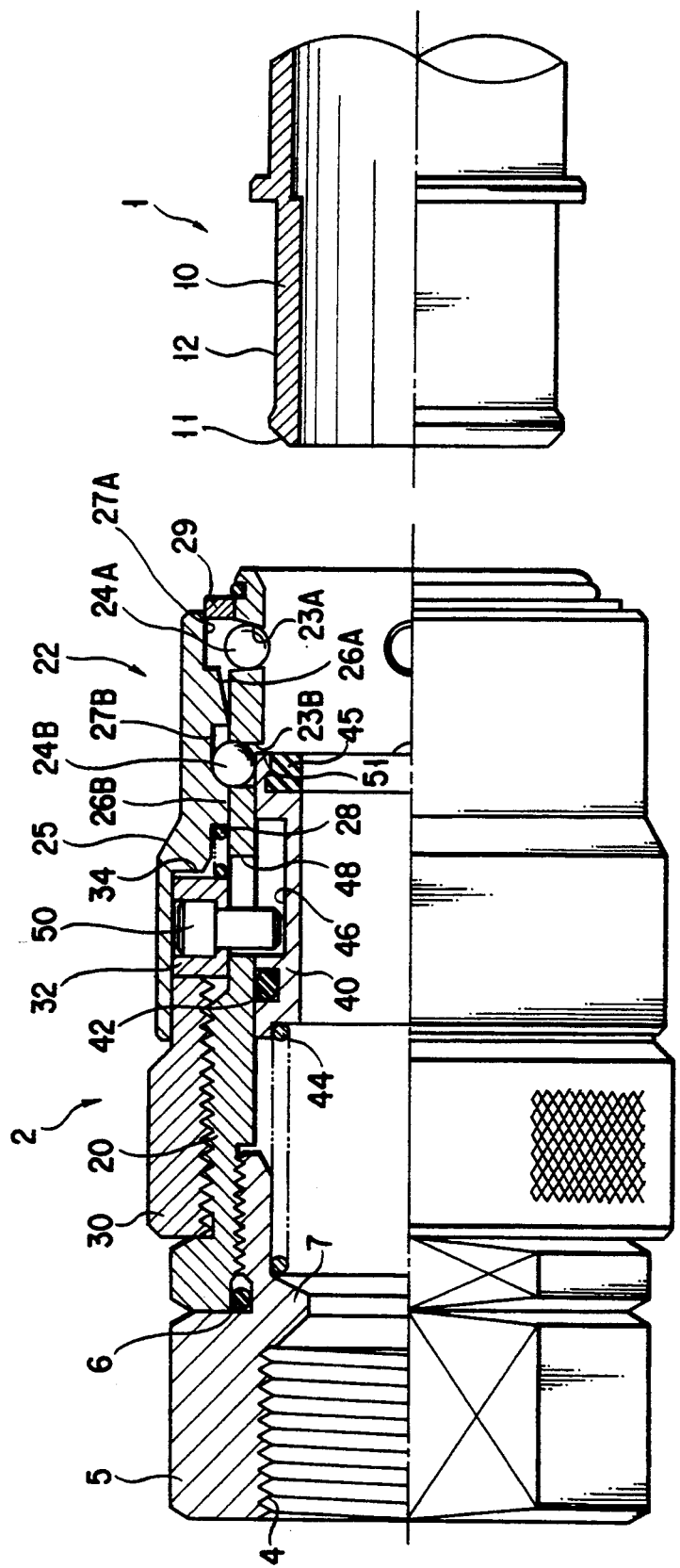
FIG. 2 is a side view of the tube coupler with the upper half portion longitudinally cross-sectioned, in a free state.

FIG. 2 is a side view of a tube coupler with the upper half portion longitudinally cross-sectioned, in a completely sealed state. The tube coupler comprises a plug 1 and a socket 2. In the subsequent description, the side and direction of the plug 1 and the socket 2 connected or to be connected are referred to as the front side, front portion or front end portion and the forward end portion, respectively, and the side and direction of the plug 1 and the socket 2 opposite to the front side, front portion or the front end portion and the forward are referred to as the rear side, the rear portion or rear end portion, respectively.

The socket 2 comprises an adaptor 5 provided on its rear end portion with an inner thread 4 for pipe connection and a main tubular socket body 20 having a rear end portion threadably engaged with the outer peripheral surface of the adaptor 5 through an O-ring 6. A ball-locking type locking mechanism 22 is provided on the front portion of the main tubular socket body 20.

In the locking mechanism 22 of this embodiment, two rows of locking balls are arranged in tandem so as to prevent the plug 1 and the socket 2 from being bent. In other words, balls 24A and 24B are idly fitted in a plurality of tapered holes 23A and 23B formed circumferentially in the front portion of the main tubular socket body 20 in such a manner that the balls 2A and 24B are rollably movable in the centripetal and centrifugal directions. When the plug 1 and the socket 2 are connected together, the movement of the balls 24A and 24B in the centrifugal direction is restricted by the sleeve 25 slidably mounted on the outer peripheral surface of the main tubular socket body 20.

Reference numerals 26A and 26B are ball holding portions formed in the inner surface so as to correspond to the tapered holes 23A and 23B, and reference numerals 27A and 27B are ball releasing portions for the balls 24A and 24B. When the balls 24A engage with and disengage from the main tubular plug body 10, the balls 24B also engage with and disengage therefrom.

The sleeve 25 is prevented from slipping off by a stop ring 29 fitted on the front end portion of the main tubular socket body 20.

An operating ring 30 threadably engages the outer peripheral surface of the rear portion of the main tubular socket body 20. Between the operating ring 30 and the sleeve 25 is provided a slide ring 32 slidable on the outer peripheral surface of the main tubular socket body 20. The rear end portion of the sleeve 25 is fitted on the front portion of the outer peripheral surface of the operating ring 30. A sleeve spring 28 is arranged between the front end portion of the slide ring 32 and a stepped portion 34 formed on the inner surface of the sleeve 25, and always urges the sleeve 25 forward and the slide ring 32 rearward.

A cylindrical holder 40 is slidably inserted in the main tubular socket body 20, and the inner surface of the of the main tubular socket body 20 and the outer surface of the cylindrical holder 40 are sealed by an O-ring 42. A compression coil spring 44 is arranged between the rear end portion of the holder 40 and a projection 7 formed on the inner peripheral surface of the adaptor 5 so as to always urge the holder forward.

A ring packing 45 is fitted in the front end portion of the holder 40. The holder 45 abuts against the front end face 11 of the main tubular plug body 10 and can effect sealing between the front end face 11 and the front end portion of the holder 40.

In an intermediate portion of the outer peripheral surface of the holder 40 is formed an annular groove 46 with which pins 50 described later are engageable. By appropriately selecting the width (the size measured in a back-and-forth direction) of the annular groove 46, the front end face 11 of the main tubular plug body 10 is further pressed by the packing 45 against the front end portion of the holder 40 so as to be sealed completely when the pins 50 engage the front end portion of the annular groove 46, and the holder 40 rests on a resting portion 51 of the main tubular socket body 20.

A pair of elongated through holes 48 extending axially of the main tubular socket body 20 are formed in an axially symmetrical manner on those portions of the socket body 20 which correspond to the ranges in which the slide ring 32 slides on the outer surface of the socket body 20. The two pins 50 extend from the outer surface of the side ring 32 in the radially inward direction through the elongated holes 50, and the distal ends of the pins 50 are inserted in the annular groove 46 of the holder 40.

The operation the coupler of this embodiment is as follows.

As shown in FIG. 2, the plug 1 and the socket 2 are placed opposed to each other. As the front end face 11 of the main tubular plug body 10 is inserted into the main tubular socket body 20, the locking balls 24A in a free state move on the outer peripheral surface of the main plug body 10 in contact therewith. The front end face 11 of the main tubular plug body 10 abuts against the packing 45 and causes the holder 40 to start to retreat against the biasing force of the compression coil spring 44.

Figure 3:
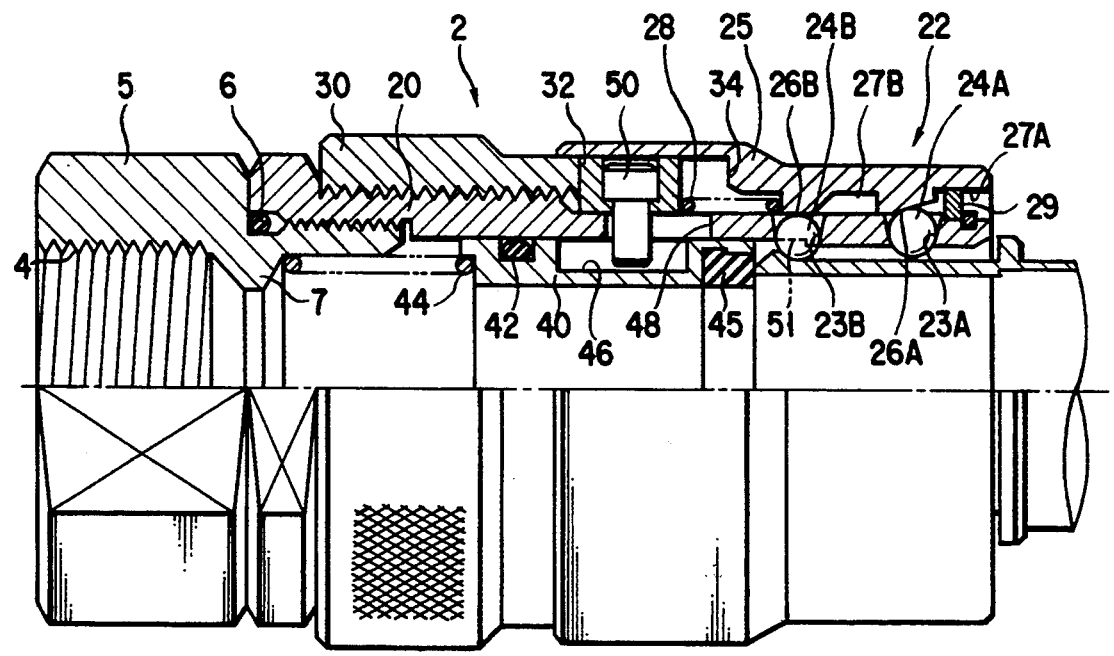
FIG. 3 is a side view of the tube coupler with the upper half portion longitudinally cross-sectioned, when the tube coupler is in the progress of connection.

Then, the balls 24B supported by the outer peripheral surface of the front portion of the main tubular plug body 10 moves on the outer peripheral surface 12 of the main plug body 10. Thus, as shown in FIG. 3, the sleeve 25 is released from the restriction by the balls 24B and is urged forwardly by the sleeve spring 28, and the balls 24B are pressed by the ball holding portion 26B in the radially inward direction. In this condition, the ball holding portion 26A also presses the balls 24A in the radially inward direction to hold the outer peripheral surface 12 of the main plug body 10. In this way, the plug 1 and the socket 2 are connected together by means of the ball type locking mechanism 22.

Figure 1:
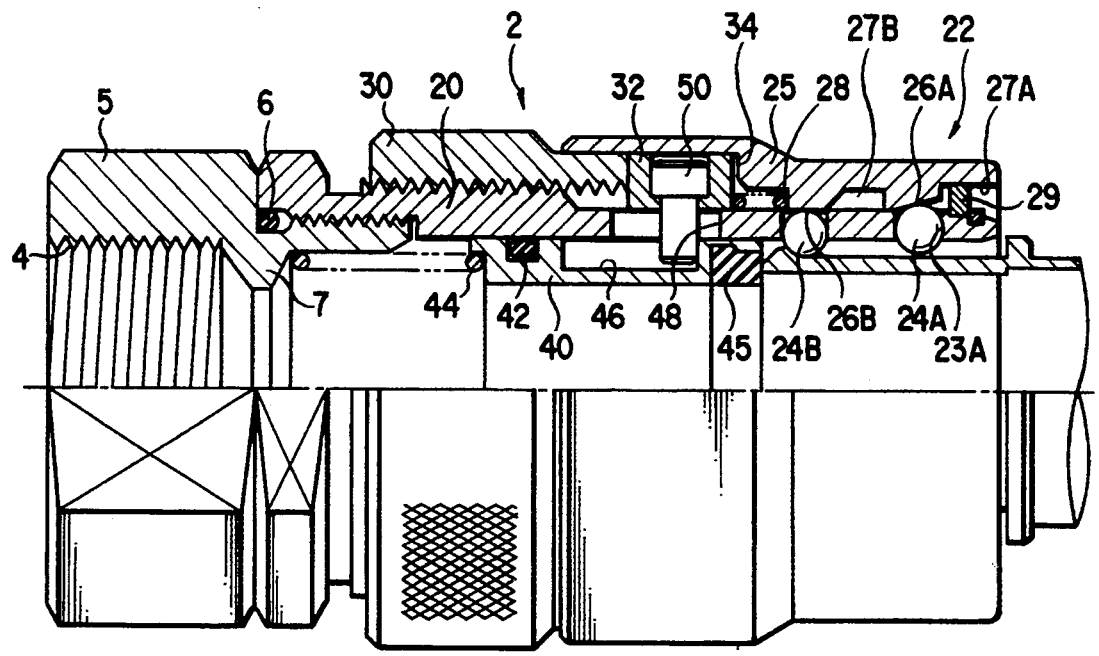
FIG. 1 is a side view of a tube coupler with the upper half portion longitudinally cross-sectioned, in a completely sealed state.

After that, as shown in FIG. 1, the operating ring 30 is rotated to advance the slide ring 32 against the biasing force of the sleeve spring 28 and the front end portion of the slide ring 32 is positioned at the vicinity of the rear end face of the step 34 of the sleeve 25, whereby the retreat of the sleeve 25 is limited.

In this case, the holder 40 engaging the slide ring 32 through the pins 50 advances and strongly presses the packing 45 against the front end face of the main plug body 10 so as to effect complete sealing between the front end face 11 and the front end portion of the holder 40.

On the other hand, upon disengaging the plug 1 from the socket 2, the operating ring 30 is rotated in the opposite direction to the direction of engagement as described above. The slide ring 32 retreats by the biasing force of the sleeve spring 28 (see FIG. 3). Thus, the restriction of sleeve retreat is released and the sleeve 25 is rendered slidable along the main socket body 20.

When the sleeve 25 is retreated in this condition, the ball releasing portions 27A and 27B and the balls 24A and 24B coincide with each other and unlocking is carried out. The balls 24B are retreated in the ball releasing portion 27B and takes a state in which the advancement of the sleeve 25 is restricted. The balls 24A coincide with the ball releasing portion 27A so as to project from and enter the ball releasing portion 27A. Thus, the ball type locking mechanism 22 is unlocked. In this condition, the main plug body 10 together with the holder 40 is urged rearward by means of the biasing force of the compression coil spring 44. Thus, the plug 1 and the socket 2 are separated from each other smoothly. The plug 1 may be formed in the shape of pipe-like elongated configuration provided that the plug has a ridge radially outwardly protruded from the outer surface of the main tubular plug body 10 at the end thereof. The ridge will be engaged interlocking by the row of balls 23B or the row of balls 23A when the plug 1 is inserted in the socket 2.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A tube coupler for effecting fluid connection between a first tube and a second tube, comprising a main tubular socket body having a first end portion connected to said first tube and a second end portion which is open, a main tubular plug body removably connected to said main tubular socket body and having a first end portion connected to said second tube and a second end portion inserted in said second end portion of said main tubular socket body, and a locking mechanism for locking together said main tubular socket body and said main tubular plug body in a state in which said second end portion of said main tubular plug body is inserted in said second end portion of said main tubular socket body, said locking mechanism having a sleeve slidably mounted on an outer peripheral surface of said second end portion of said main tubular socket body and a plurality of locking balls whose engagement with and disengagement from an outer peripheral surface of said main tubular plug body are controlled by operation of said sleeve, said tube coupler further comprising:

an operating ring threadably engaging an outer peripheral surface of said first end portion of said main tubular socket body;

a slide ring mounted on said outer peripheral surface of said main tubular socket body so as to be slidable axially between said operating ring and said sleeve;

first urging means for urging said slide ring and said sleeve in directions in which said slide ring and said sleeve are separated from each other;

a cylindrical holder slidably fitted in said main tubular socket body and having a groove open radially outward;

second urging means for urging said holder toward said second end portion of said main tubular socket body;

sealing means provided on said holder and sealingly engageable with said second end portion of said main tubular plug body inserted into said second end portion of said main tubular socket body;

said main tubular socket body formed in a tubular wall thereof with at least one elongated hole extending axially of said main tubular socket body; and at least one pin provided on said slide ring and having a distal end portion extending in said groove, said pin being capable of pushing said holder in the same direction as a direction of movement of said operating ring toward said main tubular socket body.

2. A tube coupler according to claim 1, wherein said groove has an axial dimension larger than a diameter of said pin and extends circumferentially.

3. A tube coupler according to claim 2, wherein said slide ring has two pins arranged in a circumferentially separated manner.

4. A tube coupler according to claim 1, wherein said main tubular socket body is formed in said second end portion thereof with a plurality of radially extending holes each receiving corresponding one of said balls, said radially extending holes forming a plurality of rows separated axially from each other, each of said rows comprising a plurality of said radially extending holes separated circumferentially from each other.

5. A tube coupler according to claim 4, wherein said sleeve comprises the same number of ball holding portions as the number of said rows of said radially extending holes and the same number of ball releasing portions as the number of said rows of said radially extending holes, each of said holding portions having a land portion extending radially inward from said sleeve, for preventing radially outward movement of said balls, each of said ball releasing portions having a groove formed adjacent to the corresponding land portion, for allowing for radially outward movement of said balls.

6. A tube coupler according to claim 4, wherein each of said radially extending holes has a tapered form gradually reducing diameters radially inward and has the smallest diameter smaller than a diameter of each of said balls.

7. A tube diameter according to claim 4, wherein said main tubular plug body has a projection extending radially outward from said outer surface of said main tubular plug body, for abutting against the balls held in any one of said rows of said radially extending holes when said second end portion of said main tubular plug body is inserted in said second end portion of said tubular socket body.

8. A tube coupler according to claim 7, wherein said holder has an outer peripheral surface portion for pressing the balls held in at least one of said rows of said radially extending holes when said main tubular plug body is disengaged from said main tubular socket body, and said sleeve has an inclined face for converting a radially outward directed force applied to said balls into a force directed in a direction opposite to a direction of a biasing force of said first urging means.

9. A tube coupler according to claim 1, wherein either one of said holder and said main tubular socket body has an O-ring for effecting sealing between said holder and said main tubular socket body.

10. A tube coupler according to claim 1, wherein said main tubular socket body is provided on the outer peripheral surface of said second end portion thereof with a stop ring for preventing said sleeve from falling off.

11. A tube coupler according to claim 1, wherein each of said first and second urging means comprises a compression coil spring.

* * * * *